US008374232B2

(12) United States Patent
Graffouliere

(10) Patent No.: US 8,374,232 B2
(45) Date of Patent: Feb. 12, 2013

(54) EQUALIZER ADAPTING CIRCUIT

(75) Inventor: Philippe Graffouliere, Grenoble (FR)

(73) Assignee: STMicroelectronics S.A., Montrouge (FR)

( * ) Notice: Subject to any disclaimer, the term of this patent is extended or adjusted under 35 U.S.C. 154(b) by 653 days.

(21) Appl. No.: 12/058,913

(22) Filed: Mar. 31, 2008

(65) Prior Publication Data

US 2009/0245342 A1 Oct. 1, 2009

(51) Int. Cl.
*H03H 7/30* (2006.01)
*H03H 7/40* (2006.01)
*H03K 5/159* (2006.01)

(52) U.S. Cl. ........................................ 375/232; 375/230

(58) Field of Classification Search ................... 375/232
See application file for complete search history.

(56) References Cited

U.S. PATENT DOCUMENTS

| | | | | |
|---|---|---|---|---|
| 2001/0043650 | A1* | 11/2001 | Sommer et al. | 375/232 |
| 2003/0193366 | A1* | 10/2003 | Barksdale | 329/315 |
| 2005/0063275 | A1* | 3/2005 | Yamamoto et al. | 369/59.22 |
| 2005/0154772 | A1* | 7/2005 | Kim | 708/300 |
| 2008/0080613 | A1* | 4/2008 | Garth et al. | 375/234 |
| 2009/0098828 | A1* | 4/2009 | Furman et al. | 455/63.1 |
| 2009/0187615 | A1* | 7/2009 | Abe et al. | 708/313 |
| 2010/0142604 | A1* | 6/2010 | Azenkot | 375/229 |

FOREIGN PATENT DOCUMENTS

JP          07202766 A  *  8/1995

* cited by examiner

*Primary Examiner* — Erin File
(74) *Attorney, Agent, or Firm* — Wolf, Greenfield & Sacks, P.C.

(57) ABSTRACT

A channel equalizer having a filter arranged to filter an input signal, the filter including a plurality of taps, each tap generating an output signal based on a coefficient, an input for receiving the coefficients and an output for outputting a filtered signal; and coefficient generating circuitry including a graduation unit arranged to receive the input signal and an error signal indicating an error in the filtered signal, to accumulate gradient values relating to each of the coefficients based on a plurality of error values of the error signal, each of the gradient values indicating a required change in one of the coefficients, and to sequentially output the gradient values; and coefficient update unit arranged to sequentially update each of the filter coefficients in turn, based on the gradient values.

20 Claims, 5 Drawing Sheets

EQUALIZER ADAPTING CIRCUIT

FIELD OF THE INVENTION

The present invention relates to a channel equalizer, and in particular to circuitry in a channel equalizer for adapting the coefficients of the taps of a filter.

BACKGROUND OF THE INVENTION

The transmission of a signal in a multi-path environment results in a plurality of delayed versions of the signal being received by receiving circuitry. Such multi-path environments are for example the result of obstacles in the path between the transmitter and the receiver, such as buildings, features of the landscape, etc.

Circuits for receiving signals in multi-path environments generally comprise a channel equalizer for summing all of the received signals and recovering the original signal. Such channel equalizers generally comprise a filter having many taps. Each tap multiplies a delayed version of the input signal by a certain coefficient, and the outputs from all of the taps are added together to generate an output signal. The coefficients of each tap are generally calibrated for a particular environment at the start of a transmission, and may require recalibration at regular intervals, particularly in the case of dynamic transmission channels.

FIG. 1 illustrates an example of an adaptive filter 100 of a channel equalizer for receiving a signal r(t) received from a multi-path environment. Filter 100 comprises an input for receiving signal r(t), which is, for example, received by an aerial, and a series of delay elements 102 to 107, which each delay signal r(t) by a determined amount. Signal r(t) is coupled to a first multiplier 108, which multiplies this signal by a coefficient $C_0$. The outputs of the delay elements 102 to 107 are coupled to respective multipliers 109 to 115, which multiply these signals by respective coefficients $C_1$ to $C_n$. The outputs of multipliers 108 to 115 are added together by an adder 116 to generate an equalized signal y(t). Filter 100 is an adaptive filter as the coefficients of the taps are updated based on a feedback signal, allowing the frequency response of the filter to be updated.

In general, to deal with harsh multi-path environments, the filter of FIG. 1 may include as many as several thousand taps, and therefore several thousand coefficients that need to be adapted. During an adaptation phase, the values of the coefficients $C_0$ to $C_n$ are calibrated for the particular environment. Generally the coefficients are updated in response to each data signal that is received. However, due to the large number of taps, this is very slow and/or very demanding on processing power. It is a particular problem in the case of dynamic channels in which the adaptation speed may well be too slow to enable the tracking of the channels, resulting in picture loss.

Some methods have been proposed for achieving better adaptation speed. However, these generally involve matrix inversions, which require a lot of processing power and are very demanding in terms of hardware resources, making the channel equalizer bulky and expensive.

There is a need for circuitry and method for updating the filter coefficients that is both fast and efficient in terms of its hardware requirements.

SUMMARY OF THE INVENTION

It is one aim of the present invention to at least partially address one or more needs in the prior art.

According to one aspect of the invention, there is provided a channel equalizer comprising a filter arranged to filter an input signal, said filter comprising a plurality of taps, each tap generating an output signal based on a coefficient, an input for receiving said coefficients and an output for outputting a filtered signal; and coefficient generating circuitry comprising a graduation unit arranged to receive said input signal and an error signal indicating an error in said filtered signal, to accumulate gradient values relating to each of said coefficients based on a plurality of error values of said error signal, each of said gradient values indicating a required change in one of said coefficients, and to sequentially output said gradient values; and coefficient update unit arranged to sequentially update each of said filter coefficients in turn, based on said gradient values.

According to an embodiment of the present invention, the channel equalizer is part of a vestigial sideband receiving system.

According to another embodiment of the present invention, the channel equalizer further comprises a low pass filter arranged to filter said gradient values.

According to another embodiment of the present invention, the low pass filter comprises N+1 filters, where N+1 is the number of said coefficients, each of said N+1 filters arranged to filter one of said coefficients.

According to another embodiment of the present invention, the channel equalizer further comprises a gain computation block arranged to sequentially calculate gains to be applied to each of said coefficients based on said gradient values.

According to another embodiment of the present invention, the gain is calculated by said gain computation unit based on filtered values of said gradient values, and wherein each coefficient is updated by adding to it the corresponding gradient value multiplied by the corresponding gain.

According to another embodiment of the present invention, the gradient values are calculated as accumulations of LMS (least mean squares) feedback and based on said data values.

According to another aspect of the invention, there is provided a device for receiving a transmitted signal comprising a processor and receive circuitry comprising the above channel equalizer.

According to another aspect of the invention, there is provided a method of updating the filter coefficient of a filter in a channel equalizer, said filter arranged to filter an input signal and comprising a plurality of taps, each tap generating an output signal based on a coefficient and an input for receiving said coefficients and an output for outputting a filtered signal, the method comprising: receiving said input signal and an error signal indicating an error in said filtered signal; accumulating gradient values relating to each of said coefficients based on a plurality of error values of said error signal, each of said gradient values indicating a required change in one of said coefficients, said graduation values being outputted sequentially; and sequentially updating each of said filter coefficients in turn, based on said gradient values.

According to an embodiment of the present invention, each of said gradient values is generated based on one of said error values multiplied by a data value of said data signal.

According to another embodiment of the present invention, the gradient values are accumulated for at least N+1 data values, where N+1 is the number of coefficients of said filter.

DETAILED DESCRIPTION

Figure 1:
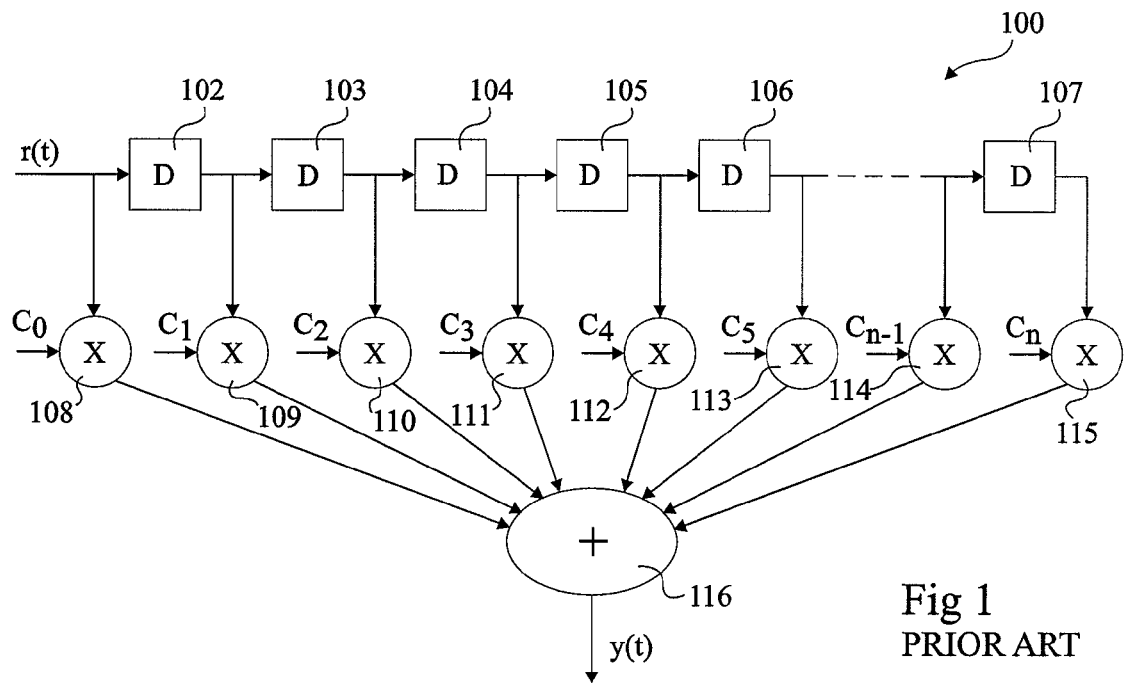
FIG. 1 (described above) illustrates a filter of a channel equalizer.
Figure 2:
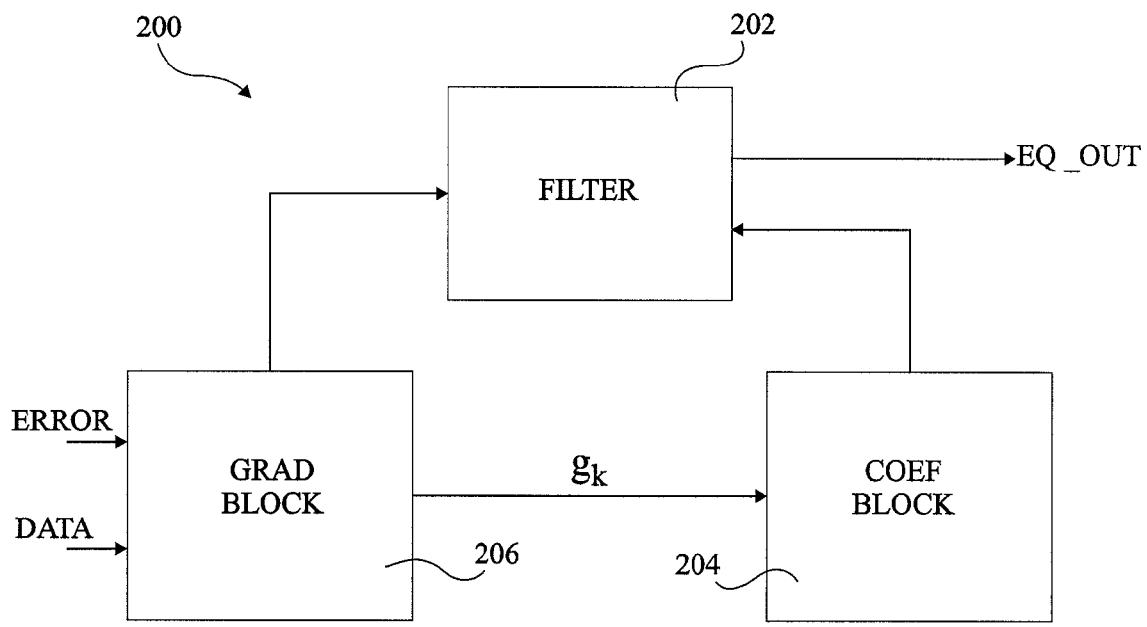
FIG. 2 illustrates an equalizer comprising adaptation circuitry according to an embodiment of the present invention.

FIG. 2 illustrates a channel equalizer 200 comprising a filter 202, which is, for example, the filter of FIG. 1, and comprises a number of taps, for example between several hundred and several thousand taps. The number of taps will depend on the particular environment in which received signals are transmitted. The filter is for example a feed-forward filter (FFF), or a data feedback filter (DFF), and comprises an output EQ_OUT.

The coefficients of the filter are updated and stored by a coefficient block 204 which is coupled to the filter, and provides the updated coefficients to the filter. A graduation block 206 is also coupled to the filter 202, and computes gradients $g_k$, where k is equal to 0 to N, there being N+1 taps. Gradients $g_k$ are used by the coefficient block to determine the updated coefficients. The gradients are for example accumulations of the LMS (least mean squares) feedback over a period of time, determined based on a data signal and an error signal as will be described in more detail below. While the example of LMS feedback has been given, in other embodiments, other feedback could be used. The graduation block comprises a data input for receiving the data signal, which is the signal r(t) in the case that the filter 202 is a feed-forward filter, or the decoded data from the filter if filter 202 is a decision feedback filter. The graduation block 206 also comprises an error input for receiving an error signal indicating the error at the output of the filter. The error is, for example, determined using a blind equalization algorithm, or using a decision directed mode (DDM).

In operation, rather than updating all of the coefficients of filter 202 at the same time, the coefficients are updated sequentially, one at a time. The graduation block 206 and the coefficient block 204 operate at a frequency which is preferably the same as the frequency of received data values, such that updated gradient values $g_k$ and filter coefficients $c_k$ are outputted at this rate, at the end of each cycle. The accumulation of the LMS feedback relating to each coefficient is staggered so that, assuming that filter 202 comprises N taps and therefore N coefficients, on a first cycle a first gradient go relating to the first coefficient is output from the graduation block 206, and then on each cycle the gradients are output in series until the Nth gradient $g_N$, after which the first gradient is ready to be output again. Likewise, coefficients $C_0$ to $C_N$ are generated by coefficient block 204 one at a time at the same rate as gradients $g_k$ are provided by the gradient block 206.

Advantageously, by accumulating the LMS feedback values over a period of time, and then updating one coefficient at a time, individual gains can be applied to each coefficient, such that adaptation of the filter can be made faster, by applying higher gains to certain coefficients. If instead the same high gains were applied to all of the coefficients at the same time, this would result in an unstable filter. Furthermore, the same circuitry can be used for calculating each individual coefficient based on an individual gain, and therefore this makes efficient use of the hardware resources of the channel equalizer.

Figure 3:
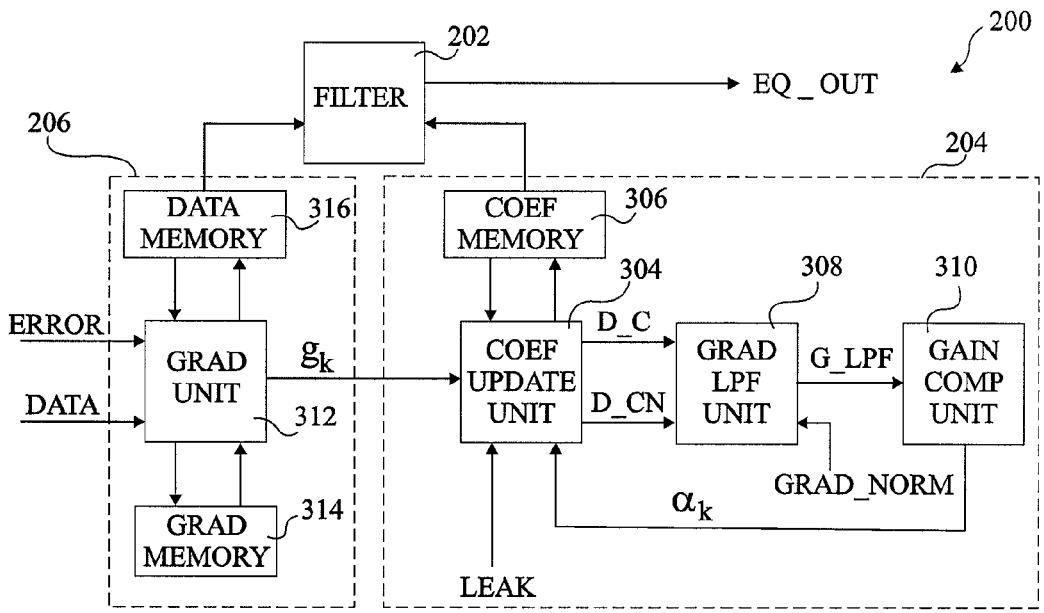
FIG. 3 illustrates the equalizer of FIG. 2 in more detail according to one embodiment of the present invention.

FIG. 3 illustrates the circuitry of FIG. 2 in more detail according to one example. As illustrated, the coefficient block 204 comprises a coefficient update unit 304, a coefficient memory 306, a graduation low pass filter (Grad LPF) unit 308, and a gain computation unit 310. The coefficient update unit 304 generates new coefficients based on the gradients $g_k$, a gain factor $\alpha_k$, and a leak value which will be described in more detail below. The Grad LPF unit 308 filters the graduations, and the gain computation unit 310 generates the gain value $\alpha_k$ based in the filtered graduations.

The graduation block 206 comprises a graduation unit 312 which computes the gradients as the accumulations of the LMS feedbacks, and stores these values in a graduation memory 314, until they are ready to be output as a gradient signal $g_k$ to the coefficient update unit 304. The graduation block also comprises a data memory to which data values are output. Data values are temporarily stored in the data memory 316 before being provided to the filter 202.

The graduation unit 312, the coefficient update unit 304, the grad LPF unit 308 and the gain computation unit 310 will now be described in more detail according to particular examples with reference to FIGS. 4, 5, 6 and 7 respectively.

Figure 4:
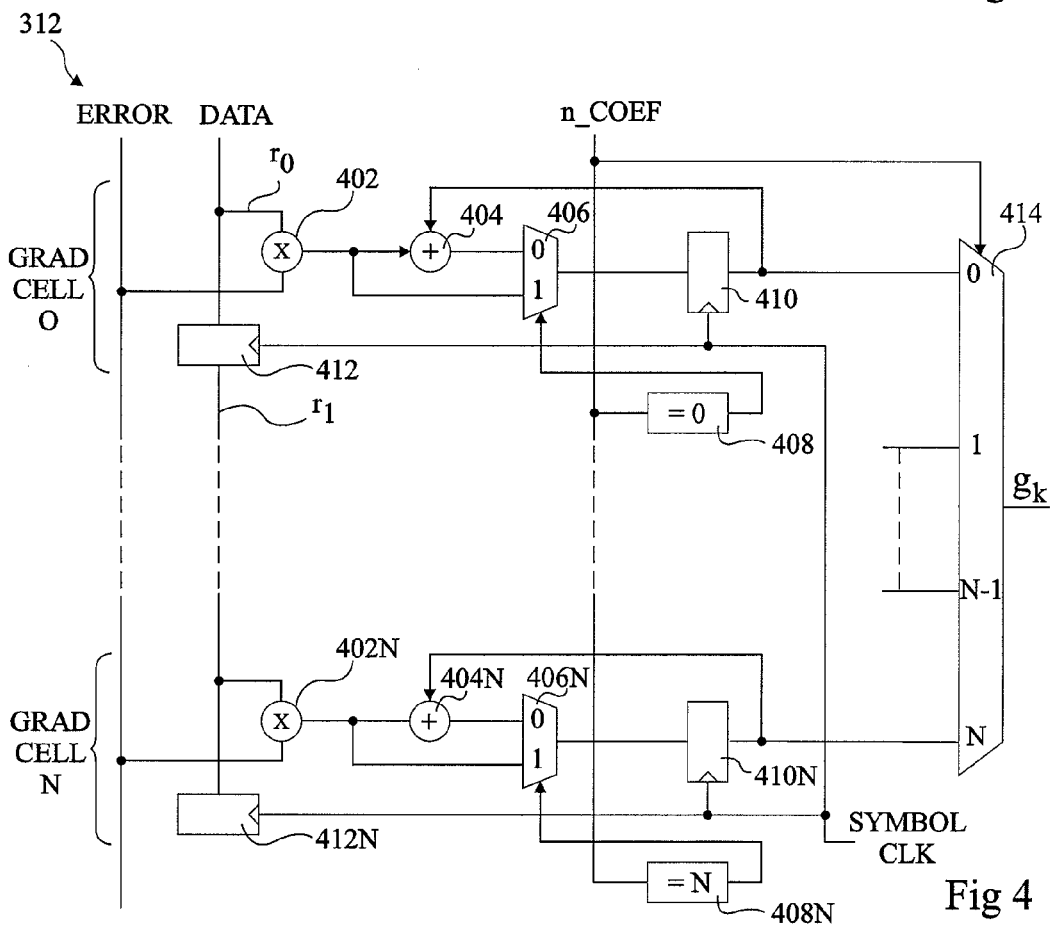
FIG. 4 illustrates the graduation unit of FIG. 3 in more detail according to an embodiment of the present invention.

FIG. 4 illustrates the graduation unit 312, which comprises a series of graduation cells 0 to N, where N is equal to the total number of coefficients minus 1. The first graduation cell 0 comprises a multiplier 402 coupled to multiply the error input signal and the data input signal. As mentioned above, the graduation unit 312 functions at the same frequency as data is received, and thus multiplier 402 generates a new output for each data value. The result is provided to an adder 404, which is coupled at its output to a multiplexer 406. The other input to multiplexer 406 is coupled directly to the output of multiplier 402. Multiplexer 406 is controlled by means of a logic block 408 arranged to provide a positive pulse at its output when the value of a signal n_COEF is equal to zero. Signal n_COEF is a signal which counts from 0 to N at the frequency of the data values, where there are N+1 coefficients in total. In particular, n_COEF is equal to k. The output of multiplexer 406 is coupled to a buffer 410, which is clocked by a symbol clock having the frequency of received data values. The signal symbol clock is also provided to a buffer 412 which buffers the data, and provides it to the next graduation cell in the series, in this case grad cell 1. The buffers 410 and 412 comprise the data memory 316 and graduation memory 314 of FIG. 3.

The circuitry of grad cell 0 is repeated N+1 times, and the final graduation cell N is shown at the bottom of FIG. 4. All of the grad cells 0 to N are coupled to a multiplexer 414, and in each cycle, the output from one of the buffers 410 is selected to be output by multiplexer 414, to provide a gradient value $g_k$ to the coefficient update unit 304.

In operation, on each cycle, an error value and a data value are provided, and are multiplied by multiplier 402. This provides the LMS feedback, which is added to the currently accumulated gradient value by adder 404, except on the cycle in which the coefficient of a particular grad cell is provided to the output, in which case the output from multiplier 402 is directly selected by multiplexer 406, to reset the accumulated gradient value. The output of multiplexer 406 is buffered by a buffer 410, and the output of buffer 410 is output by multiplexer 414 of the graduation block.

Figure 5:
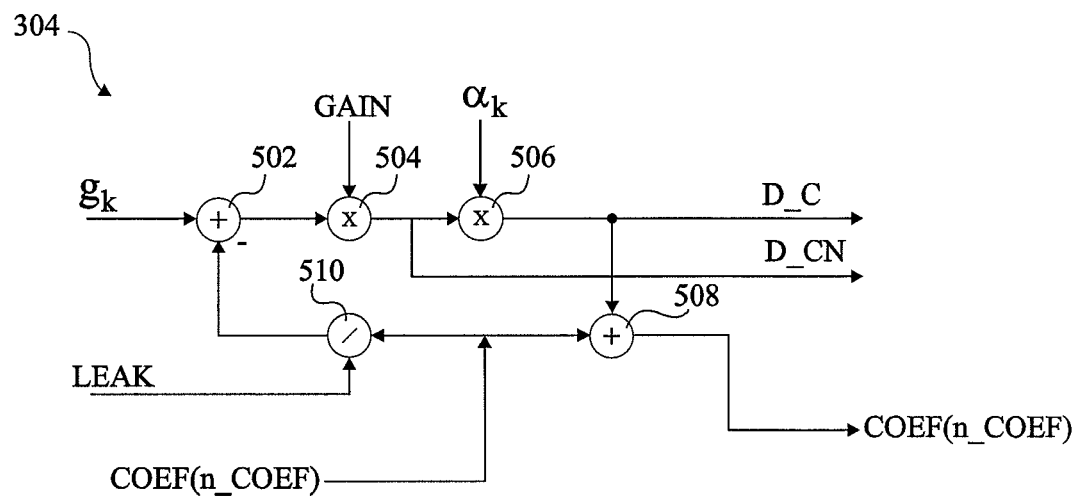
FIG. 5 illustrates the coefficient update unit of FIG. 3 in more detail according to an embodiment of the present invention.

FIG. 5 illustrates the coefficient update unit 304, which comprises an adder 502, receiving as an input the gradient value $g_k$ from the graduation unit 312. The output of adder 502 is coupled to a multiplier 504, which multiplies this value by a gain value, which is the regular LMS gain. This value is, for example, stored in a register, is the same for all coefficients, and can be determined experimentally. The output of multiplier 504 is coupled to a further multiplier 506 which multiplies this value by gain value $\alpha_k$, which is the gain value calculated by the gain computation unit 310 for each coefficient. The output from multiplier 506 is coupled to the input of an adder 508, which adds the current coefficient value COEF(n_COEF) to generate a new coefficient value. The new coefficient value is output to the coefficient memory 306. The output of multiplier 506 is also provided as an output D_C (delta coefficient), which is provided to the grad LPF unit 308, and the output of multiplier 504 is provided as an output D_CN (delta coefficient normalized) which is also provided to the grad LPF unit 308, as will be described in more detail below. D_CN is effectively a unitary gain delta coefficient. A divider 510 is provided which receives the current coefficient value and divides this by a leak value. The leak value is a leak factor for the LMS adaptation and is for example stored in a register and is programmable. The leak value allows the gain to be reduced, which can improve performance by reducing noise. The output of divider 510 is subtracted from the graduation value $g_k$ by adder 502.

Figure 6:
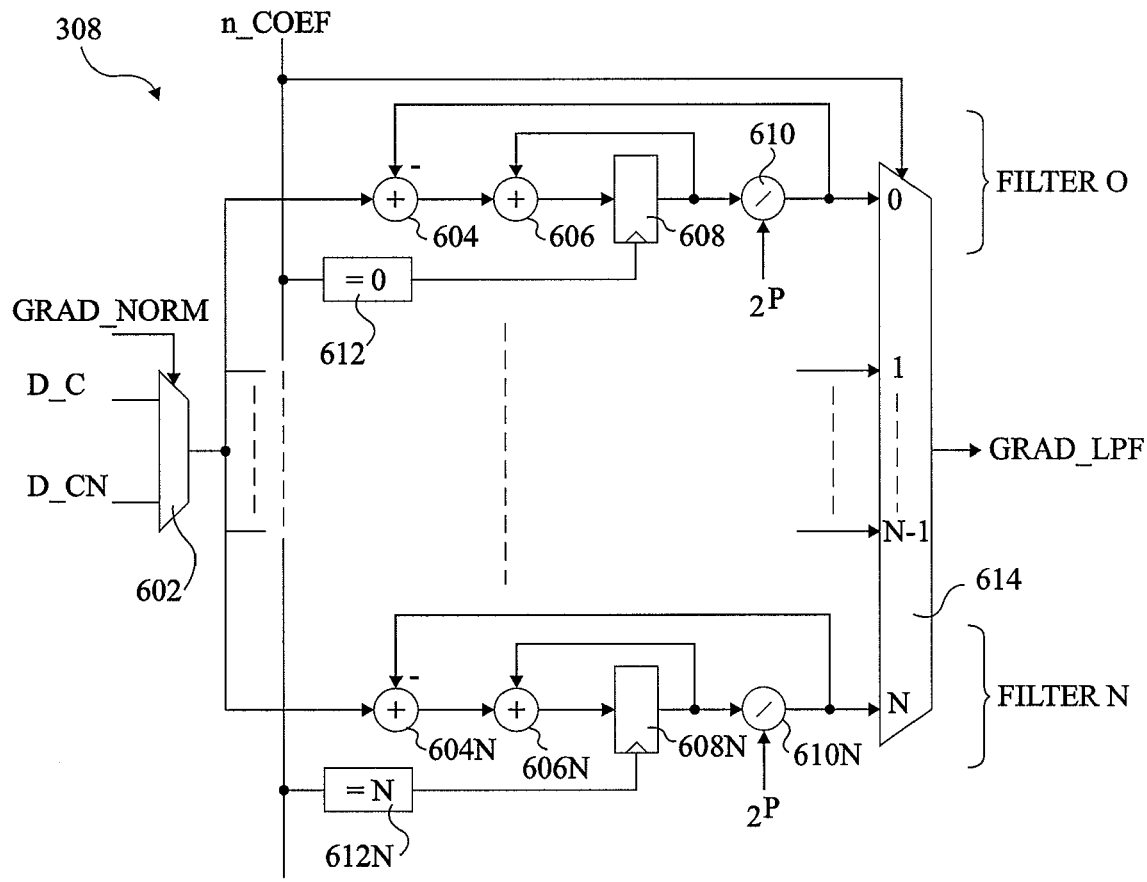
FIG. 6 illustrates the graduation low pass filter unit of FIG. 3 in more detail according to an embodiment of the present invention.

FIG. 6 illustrates the grad LPF unit 308 in more detail. The grad LPF unit 308 filters all the graduation values and comprises as many filters as there are coefficients. This allows the mean value of the graduation values to be used for further gain control.

Grad LPF unit 308 receives the signals D_C and D_CN from the coefficient computation update unit 304. As illustrated, this unit comprises a multiplexer 602, which receives the signals D_C and D_CN, one of which is selected for output by a selection signal GRAD_NORM. This multiplexer allows the low pass filter operation to be based on either D_C or D_CN. In general, the value D_C, which is the actual gradient of a coefficient, is preferable in the case of a feed-forward filter, whereas the value D_CN, which only depends on the graduation value, is preferably used in a decision feedback filter.

Filters 0 to N are provided, and each filter comprises an adder 604, which receives the output of multiplexer 602. The output of adder 604 is coupled to a further adder 606, which is in turn coupled at its output to a buffer 608. The output of buffer 608 is fed back as the second input to adder 606, to be added to the output of adder 604. The output of buffer 608 is coupled to a divider 610, which divides the output of buffer 608 by a value 2P, which is a cut-off frequency. The cut-off frequency is chosen as a trade-off between providing well targeted dynamics and avoiding noise generated by incorrectly estimated gains. The value is preferably programmable such that it can be updated during the lifetime of the device. Buffer 608 is clocked by a logic block 612 which is coupled to the input n_COEF and clocks the buffer 608 when n_COEF is equal to 0. As described above with reference to FIG. 4, n_COEF is a count value that counts from 0 to N. The output of divider 610 is fed back as the second input to adder 604, where it is subtracted from the output of multiplexer 602. The output of divider 610 is also provided as an input to a multiplexer 614, which is similarly coupled to the output of all of the filter blocks, and provides the output GRAD_LPF, which is a filtered gradient value from each of the filter blocks in turn. Multiplexer 614 is controlled by the value of n_COEF, such that gradient values are selected for output sequentially.

Figure 7A:
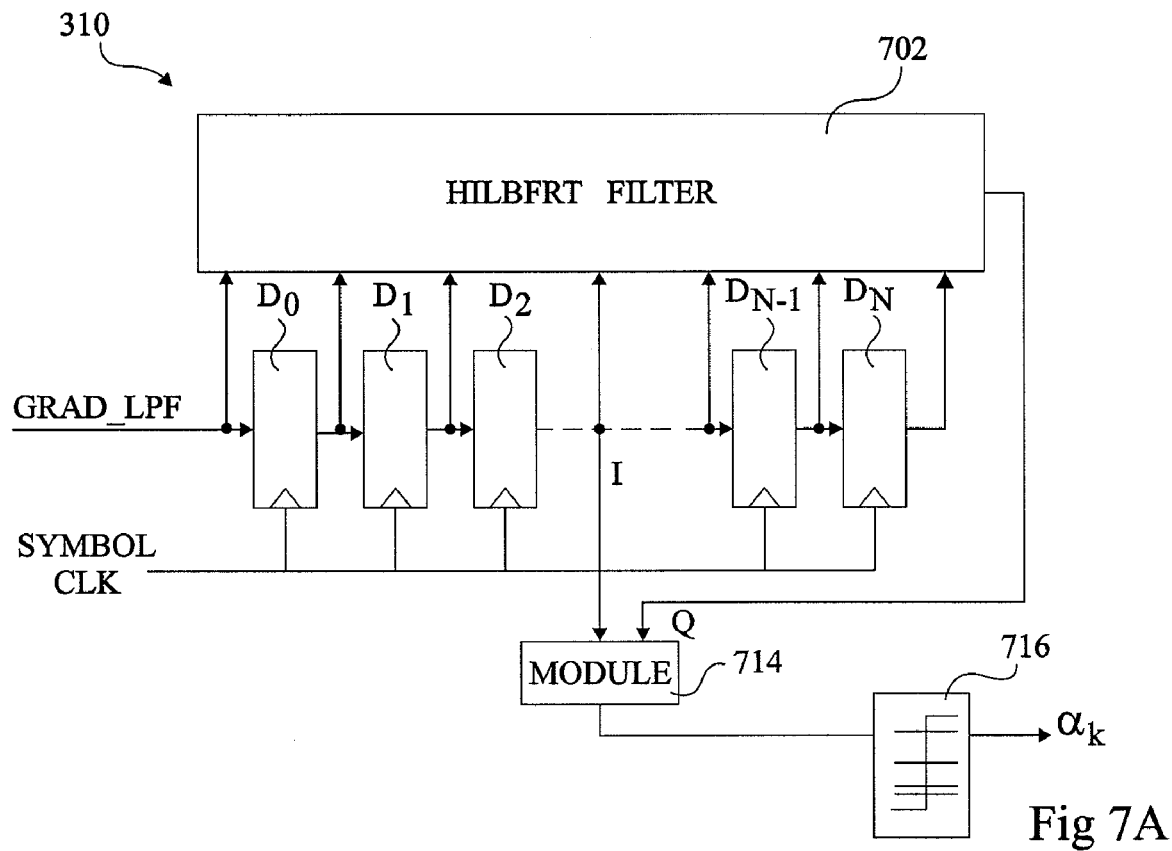
FIG. 7A illustrates the gain computation unit of FIG. 3 in more detail according to an embodiment of the present invention.

FIG. 7A illustrates the gain computation unit 310 in more detail, which calculates the gain value $\alpha_k$ used by the coefficient update unit to determine the next coefficient value. This gain is based on the filtered gradient value GRAD_LPF provided by the grad LPF unit 308. GRAD_LPF is provided to a Hilbert filter 702. It is also provided to a series of buffers $D_0$ to $D_n$, which are clocked by a symbol clock having the frequency of the received data. A module 714 receives a signal I which is the input signal GRAD_LPF delayed by a time D, where D=(n−1)/2. Signal I is thus output by the buffer $D_{(n-1)/2}$. Module 714 also receives the output Q of the Hilbert filter. Module 714 performs a complex module calculation based on the output Q of the Hilbert filter, and the signal I. This can be written as module(GRAD_LPF+jHilbert(GRAD_LPF)). The complex module calculation is for example approximated as Max(I,Q)+3(Min(I,Q))/8. The gain computation unit advantageously uses a complex module calculation, which improves performance when dealing with echoes, and also reduces the hardware of amplifier 506.

The output of module 714 is provided to a multi-threshold comparator 716, which outputs the gain value $\alpha_k$ based on the output of module 714. The multi-threshold comparator 716 provides a simplified solution for reducing hardware required to generate gain values, and is based on a power of 2 law. When the grad LPF unit 308 is arranged to select the D_C input, which depends on gain, a quasi-linear gain law is preferably used by the multi-threshold comparator, such that the gain $\alpha_k$ increases linearly with respect to the output of module 714.

Figure 7B:
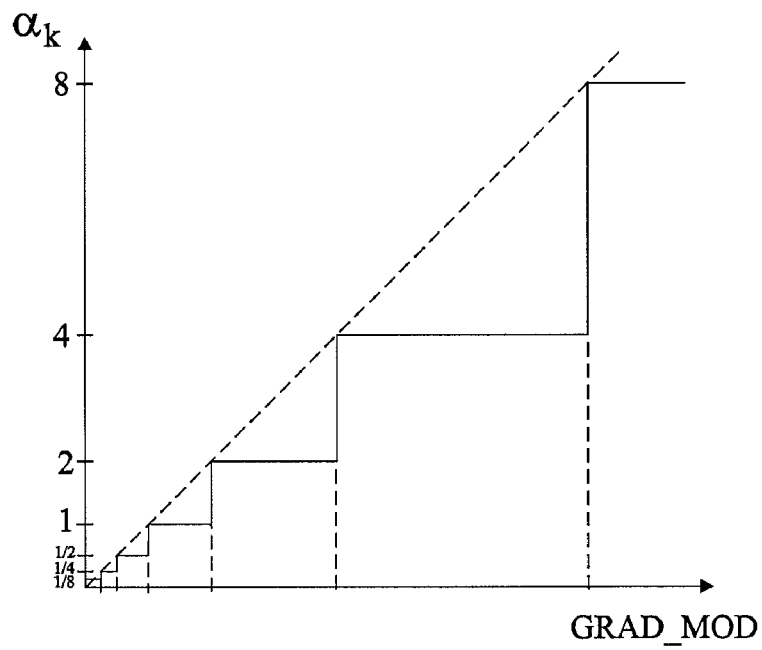
FIG. 7B is a graph illustrating an example of a quasi-linear relationship for determining the gain according to one embodiment of the present invention.

FIG. 7B illustrates an example of a quasi-linear relationship used for determining the gain $\alpha_k$ based on the signal GRAD_MOD, which is the output of module 714. In this example, the comparator selects one of the following gains: ⅛, ¼, ½, 1, 2, 4, 8. As illustrated, the threshold values of GRAD_MOD are chosen to also increase based on a power of two, such that the relationship between $\alpha_k$ and GRAD_MOD is linear.

Alternatively, when the grad LPF unit 308 is arranged to select the D_CN input, which does not depend on gain, a quasi-exponential law is preferably use by the multi-threshold comparator, in other words such that the gain $\alpha_k$ increases exponentially with respect to the output of module 714.

Figure 7C:
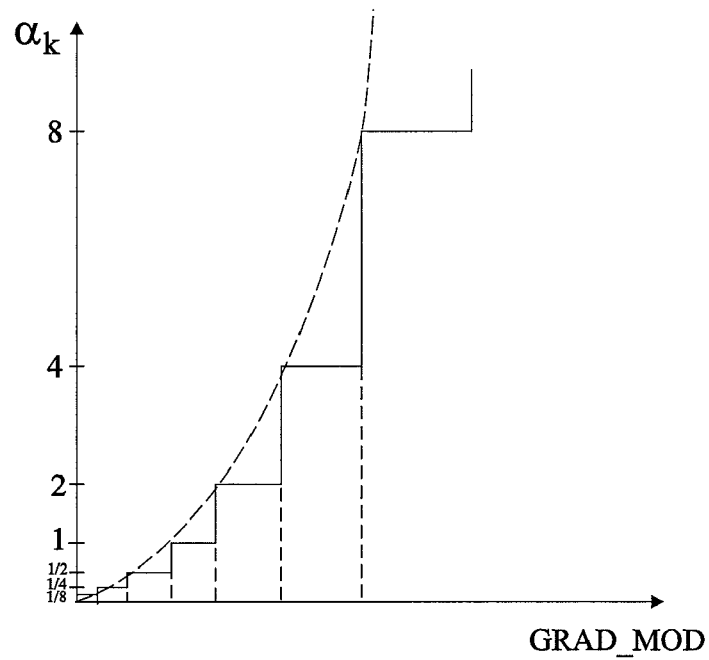
FIG. 7C is a graph illustrating an example of a quasi-exponential relationship for determining the gain according to an alternative embodiment of the present invention.

FIG. 7C illustrates an example of a quasi-exponential relationship used for determining the gain $\alpha_k$ based on the signal GRAD_MOD. Again the comparator selects one of the gains ⅛, ¼, ½, 1, 2, 4 and 8, but the threshold values of GRAD_MOD are chosen to increase according to an exponential relationship, such that the relationship between $\alpha_k$ and GRAD_MOD is exponential.

In some embodiments, a mixture of D_C and D_CN can be used as the basis for the gain computation, and in this case, the comparator could use an intermediate relationship between the quasi-linear and quasi-exponential relationships above.

Figure 8:
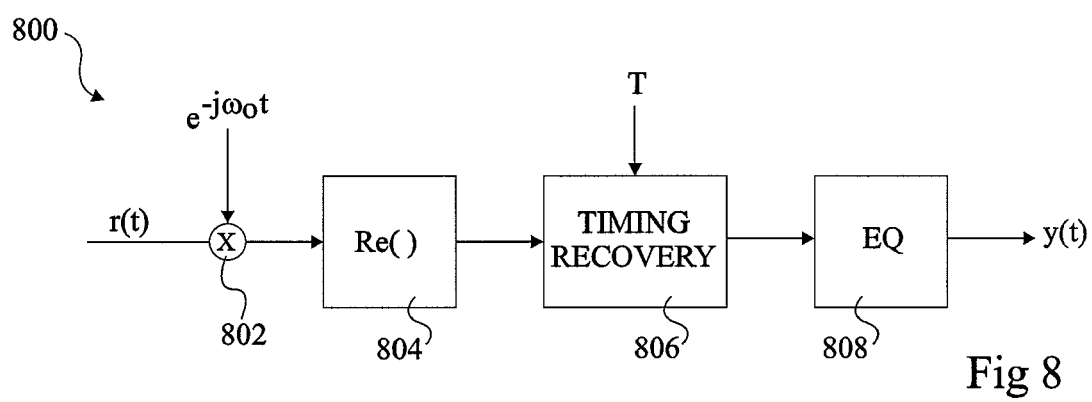
FIG. 8 illustrates receiving circuitry according to an embodiment of the present invention.

FIG. 8 illustrates an overview of receiving circuitry 800 for generating a demodulated, equalized data signal y(t). As illustrated, a signal r(t) is received and demodulated by a multiplier 802, which multiplies the signal by a term $e^{-j\omega_0 t}$. The real part of the output of multiplier 802 is then extracted by block 804. The output of block 804 is coupled to timing recovery circuitry 806, which recovers timing of the signal using a time reference signal T. The output of the timing recovery circuit 806 is coupled to a channel equalizer 808, which, for example, comprises the circuitry of FIG. 2 or 3 described above, and which outputs the data signal y(t).

Receiving circuitry 800 is for example part of a VSB (vestigial sideband) system, such as 8-VSB or 15-VSB. Alternatively, it could be part of a system for receiving other types of amplitude modulated signals, including PAM (pulse amplitude modulation) and QAM (quadrature amplitude modulation) formats.

Figure 9:
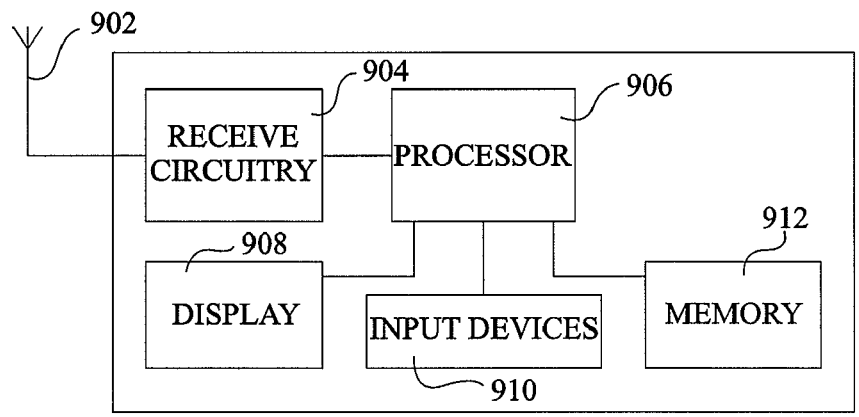
FIG. 9 illustrates a device according to an embodiment of the present invention.

FIG. 9 illustrates a device 900 comprising a channel equalizer as described herein. Device 900 is, for example, a digital television decoder such a set top box coupled to a television. Alternatively, device 900 could be any circuitry that functions to decode a transmitted digital signal in a multi-path environment, such as a mobile telephone, personal computer, etc.

An aerial 902 is provided for receiving the broadcast signal. Device 900 further comprises receive circuitry 904, which, for example, comprises the receive circuitry 800 of FIG. 8. The receive circuitry is coupled to a processor 906 which is, for example, the main processor of the device. A display 908, input devices 910, for example a keypad or a mouse, and memory 912 are provided coupled to processor 906.

Thus a channel equalizer has been described herein comprising a filter and coefficient generating circuitry for generating and updating the coefficients of the filter. The coefficient generating circuitry includes a graduation unit which accumulates feedback values relating to each of the filter coefficients based on a series of errors values relating to data values at the output of the filter, to generate gradient values indicating a required change in one of the filter coefficients. The gradient values are sequentially output to a coefficient update unit which sequentially updates each of the filter coefficients in turn, based on the gradient values. The coefficients can advantageously have individual gains determined based on averaged gradient values Advantageously, by accumulating the gradient values over a number of data values, for example for N+1 data values, where N+1 is the number of coefficients to be updated, and updating the coefficients sequentially based on these gradient values, individual adaptation gains can be provided, without requiring the complex circuitry that would be required to update all of the coefficients independently at the same time.

Advantageously, a low pass filter is provided for filtering the gradient values, and a gain computation unit is provided for generating gains to be applied to each coefficient based on the filtered gradient values.

The gain computation unit preferably comprises common circuitry for calculating the gain for each of the coefficients sequentially, and thus advantageously individual gains for each coefficient can be generated, without the complex circuitry that would be required to generate the individual gains in parallel.

It will apparent to those skilled in the art that while certain examples of channel equalizers have been described, there are numerous alternatives, modifications and improvements that will be evident to those skilled in the art.

For example, as described above, embodiments of the channel equalizer described herein could be adapted to receive any transmission of a modulated signal in a multi-path environment. Such transmission could be based on any type of modulation, and is not limited to the VSB coding described by way of example herein.

Furthermore, the channel equalizer may comprise a feed-forward filter or a decision feedback filter, a combination of both of these filters or different types of filters, as will be apparent to those skilled in the art.

Such alterations, modifications and improvements are intended to be within the spirit and scope of the invention. Accordingly, the foregoing description is by way of example only and is not intended to be limiting. The invention is limited only as defined in the following claims and the equivalent thereto.

What is claimed is:

1. A channel equalizer comprising:
a filter arranged to filter an input signal, said filter comprising a plurality of taps, each tap generating an output signal based on a coefficient, an input for receiving said coefficients and an output for outputting a filtered signal; and
coefficient generating circuitry comprising:
a graduation unit arranged to receive said input signal and an error signal indicating an error in said filtered signal, to accumulate gradient values relating to each of said coefficients based on a plurality of error values of said error signal, each of said gradient values indicating a required change in one of said coefficients, and to sequentially output said gradient values; and
a coefficient update unit arranged to sequentially update each of said filter coefficients in turn, based on said gradient values.

2. The channel equalizer of claim 1, wherein said channel equalizer is part of a vestigial sideband receiving system.

3. The channel equalizer of claim 1, further comprising a low pass filter arranged to filter said gradient values.

4. The channel equalizer of claim 3, wherein said low pass filter comprises N+1 filters, where N+1 is the number of said coefficients, each of said N+1 filters arranged to filter one of said coefficients.

5. The channel equalizer of claim 1, further comprising a gain computation block arranged to sequentially calculate gains to be applied to each of said coefficients based on said gradient values.

6. The channel equalizer of claim 5, wherein said gain is calculated by said gain computation unit based on filtered values of said gradient values, and wherein each coefficient is updated by adding to it the corresponding gradient value multiplied by the corresponding gain.

7. The channel equalizer of claim 1, wherein said gradient values are calculated as accumulations of LMS (least mean squares) feedback and based on said data values.

8. A device for receiving a transmitted signal comprising a processor and receive circuitry comprising the channel equalizer of claim 1.

9. A method of updating the filter coefficient of a filter in a channel equalizer, said filter arranged to filter an input signal and comprising a plurality of taps, each tap generating an output signal based on a coefficient and an input for receiving said coefficients and an output for outputting a filtered signal, the method comprising:
receiving said input signal and an error signal indicating an error in said filtered signal;
accumulating gradient values relating to each of said coefficients based on a plurality of error values of said error signal, each of said gradient values indicating a required change in one of said coefficients, said gradient values being outputted sequentially; and
sequentially updating each of said filter coefficients in turn, based on said gradient values.

10. The method of claim 9, wherein each of said gradient values is generated based on one of said error values multiplied by a data value of said data signal.

11. The method of claim 10, wherein said gradient values are accumulated for at least N+1 data values, where N+1 is the number of coefficients of said filter.

12. A channel equalizer comprising:
a filter arranged to filter an input signal, the filter comprising a plurality of taps, each tap of the plurality of taps being associated with a respective one of a plurality of coefficients and generating a respective output signal based on the respective one of the plurality of coefficients, and the filter further comprising an input for receiving the plurality of coefficients and an output for outputting a filtered signal; and
coefficient generating circuitry comprising:
a graduation unit arranged to receive the input signal and an error signal indicating an error in the filtered signal, to accumulate gradient values relating to each coefficient of the plurality of coefficients based on a plurality of error values of the error signal, each of the gradient values indicating a required change in one of the coefficients, and to output a first subset of the gradient values at a first time and a second subset of the gradient values at a second time, the first subset differing from the second subset; and
a coefficient update unit arranged to update a first subset of the coefficients at the first time based on the first subset of the gradient values and to update a second subset of the coefficients at the second time based on the second subset of the gradient values.

13. The channel equalizer of claim 12, wherein the graduation unit is arranged to output the gradient values sequentially one by one, and wherein the first subset of gradient values corresponds to a first one of the gradient values and wherein the second subset of gradient values corresponds to a second one of the gradient values.

14. The channel equalizer of claim 13, wherein the coefficient update unit is arranged to update the coefficients one by one and wherein the first subset of the coefficients corresponds to a first one of the coefficients and wherein the second subset of the coefficients corresponds to a second one of the coefficients.

15. A method of updating filter coefficients of a filter in a channel equalizer, the filter arranged to filter an input signal and comprising a plurality of taps, each tap of the plurality of taps generating an output signal based on a respective filter coefficient of the filter coefficients, the filter further comprising an input for receiving the filter coefficients and an output for outputting a filtered signal, the method comprising:

receiving the input signal;
receiving an error signal indicating an error in the filtered signal;
accumulating gradient values relating to each of the filter coefficients based on a plurality of error values of the error signal, each of the gradient values indicating a required change in one of the filter coefficients;
outputting a first subset of the gradient values at a first time and a second subset of the gradient values at a second time, the first subset differing from the second subset; and
updating a first subset of the filter coefficients at the first time based on the first subset of the gradient values and updating a second subset of the filter coefficients at the second time based on the second subset of the gradient values.

16. The method of claim 15, wherein outputting the first subset of the gradient values at the first time and the second subset of the gradient values at the second time comprises outputting the gradient values sequentially one by one, and wherein the first subset of gradient values corresponds to a first one of the gradient values and wherein the second subset of the gradient values corresponds to a second one of the gradient values.

17. The method of claim 16, wherein updating the first subset of the filter coefficients at the first time based on the first subset of the gradient values and updating the second subset of the filter coefficients at the second time based on the second subset of the gradient values comprises updating the filter coefficients sequentially one by one, and wherein the first subset of the filter coefficients corresponds to a first one of the filter coefficients and wherein the second subset of the filter coefficients corresponds to a second one of the filter coefficients.

18. The channel equalizer of claim 1, wherein said filter is a decision-feedback filter (DFF).

19. The channel equalizer of claim 1, wherein sequentially updating each of said filter coefficients in turn comprises computing a value of one of said filter coefficients and outputting the value of the one of said filter coefficients prior to computing a value of a subsequent filter coefficient.

20. The channel equalizer of claim 12, wherein updating each of the first and second subsets of coefficients comprises computing values of coefficients in one of the first or second subset of coefficients and outputting the values of the coefficients in the one of the first or second subset of coefficients prior to computing values of coefficients in a subsequent subset of coefficients.

\* \* \* \* \*

UNITED STATES PATENT AND TRADEMARK OFFICE
CERTIFICATE OF CORRECTION

PATENT NO.         : 8,374,232 B2
APPLICATION NO.    : 12/058913
DATED              : February 12, 2013
INVENTOR(S)        : Philippe Graffouliere Page 1 of 1

It is certified that error appears in the above-identified patent and that said Letters Patent is hereby corrected as shown below:

In the Specifications:

At column 3, line 66, "first gradient go" should read --first gradient $g_0$--.

At column 5, line 61, "a value 2P," should read --a value 2p,--.

Signed and Sealed this
Seventh Day of May, 2013

Teresa Stanek Rea
*Acting Director of the United States Patent and Trademark Office*